United States Patent [19]

Kawashima et al.

[11] Patent Number: 4,937,830
[45] Date of Patent: Jun. 26, 1990

[54] SEMICONDUCTOR MEMORY DEVICE HAVING FUNCTION OF CHECKING AND CORRECTING ERROR OF READ-OUT DATA

[75] Inventors: Hiromi Kawashima, Kawasaki; Ryoji Hagiwara, Yokohama, both of Japan

[73] Assignee: Fujitsu Limited, Kawasaki, Japan

[21] Appl. No.: 195,329

[22] Filed: May 18, 1988

[30] Foreign Application Priority Data

May 19, 1987 [JP] Japan .................... 62-120297

[51] Int. Cl.⁵ .............................................. G06F 11/10
[52] U.S. Cl. ...................................................... 371/40.1
[58] Field of Search .................... 371/38, 39, 40, 37.3, 371/38.1, 39.1, 40.1, 40.2; 365/200

[56] References Cited

U.S. PATENT DOCUMENTS

| | | | |
|---|---|---|---|
| 4,653,052 | 3/1987 | Doi ................................... | 371/38 X |
| 4,703,453 | 10/1987 | Shinoda ............................. | 371/38 X |
| 4,726,021 | 2/1988 | Horiguchi .......................... | 371/38 |
| 4,780,875 | 10/1988 | Sakai ................................. | 371/38 |

OTHER PUBLICATIONS

"Error Check and Correction for Soft Error of Dynamic Random-Access Memory", IBM TDB, V31, No. 10, 3/1989, pp. 58-60.
"THAM 10.4: A 64Kb CMOS EEROM with On-chip ECC", 1984 IEEE International Solid-State Circuits Conference Digest of Technical Papers, Feb. 23, 1984.

*Primary Examiner*—Jerry Smith
*Assistant Examiner*—Robert W. Beausoliel
*Attorney, Agent, or Firm*—Armstrong, Nikaido, Marmelstein, Kubovcik & Murray

[57] ABSTRACT

A semiconductor memory device includes a memory cell array; a sense amplifying circuit, operatively connected to the memory cell array, for sensing the information bits and the check bits; a latch circuit, operatively connected to the sense amplifying circuit, for latching the information bits and the check bits sensed by the sense amplifying circuit; and a circuit for correcting an error in logical level in the information bits.

The latch circuit latches the logical level of the bit signal at a predetermined time after a change in an address signal. Thus, regardless of whether or not a time at which the logical level of the bit signal of the sense amplifying circuit is settled coincides, the influence is not exerted on the operation of the subsequent error correcting circuit. As a result, it is possible to prevent the appearance of a hazard in the output data and, accordingly, to realize a perfect ECC relief, while increasing a reliability in the reading operation as a device.

10 Claims, 12 Drawing Sheets

Fig. 2b (AT TIME OF ta)

Fig. 2c (AT TIME OF tb)

Fig. 2d (AT TIME OF tc)

SEMICONDUCTOR MEMORY DEVICE HAVING FUNCTION OF CHECKING AND CORRECTING ERROR OF READ-OUT DATA

BACKGROUND OF THE INVENTION

1. Field of the Invention

The present invention relates to a semiconductor memory device and, more particularly, to a semiconductor memory device having a circuit for automatically checking and correcting an error of data output from a sense amplifying circuit, hereinafter referred to as an S/A circuit, provided for a memory cell array.

2. Description of the Related Art

Referring to an example of a memory, for example, an electrically erasable and programmable read only memory (EEPROM), a possible number of times of the repetition of re-writing is defined as one of the important characteristics of the EEPROM. The possible number of times thereof is defined from a viewpoint in that a manufacturer guarantees a quality of the device for a user. However, when the re-writing is frequently repeated, there is a possibility that a memory cell becomes non-functional due to a crystallinity of semiconductor constituting the memory cell, a deterioration in a tunnel insulation film and the like, particles of dust, an unsatisfactory patterning, or the like. As for most of the memories which become non-functional due to these causes, the ratio of the non-functional bits to all bits, e.g., 64K or 65,536 bits, is 1 to 10 bits and extremely small. That is, it lies in the accidental failure region in the classification of failures.

To cope with the problem, Seeq Tech. Co. proposed a device in 1984 in which an error check and correct (ECC) circuit together with a memory is mounted on a chip (ISSCC 84, THAM 10.4). In the ECC circuit, when an information data is written into cells, a check data is generated based on a combination of certain bits of the information data. Next, when the information data written into the cells is read out via an S/A circuit, the check and correction of the information data is carried out based on a combination of certain bits of the check data and information data. That is, where a certain bit of the information data is wrong, the logical level of the wrong bit is inverted to the right level. Thus, according to the ECC circuit, even if a cell of one bit among one word becomes non-functional, a right output signal can be read out.

In the EEPROM device having the ECC circuit, however, when a margin between logical levels "1" and "0" of a certain cell is decreased due to the deterioration in the tunnel insulation film and, accordingly, a transition of level of the output of a corresponding S/A is delayed, the ECC circuit cannot quickly effect its check and correct operation. Therefore, a problem occurs in that the ECC circuit once effects a correct operation for a "right" logical level of a certain cell and, after a while, cancels the correct operation. During the operation, the logical level of the output signal of the ECC circuit transiently changes from "1" level (or "0" level) to "0" level (or "1" level) and, then, returns to "1" level (or "0" level). That is, a spike-like transient error, hereinafter referred to as a hazard, appears in the output signal of the ECC circuit. This means that the correction of error data by the ECC circuit, hereinafter referred to as an ECC relief, cannot be perfectly carried out, and is not preferable from a viewpoint of a high-accurate reading of data.

Also, where the aforementioned margin between logical levels "1" and "0" of a certain cell is decreased below a certain level, the output signal of the corresponding S/A circuit is oscillated in level in the transition region between "1" and "0". As a result, the ECC circuit effects a mis-operation. That is, the perfect ECC relief cannot be realized.

Furthermore, the above problem is not characteristic to a non-volatile memory such as an EEPROM in which charges leak from a cell or cells due to the deterioration in the cells as times go by, but can happen to a volatile memory in which the leak in a cell does not occur, e.g., a dynamic random access memory (DRAM), a static RAM (SRAM) and the like. That is, a problem arises in that, due to the non-uniformity in operation speed among each of the S/A circuits in the reading operation, a time at which a logical level of each bit of the data to be read out is settled does not coincide. Thus, the ECC circuit effects a mis-operation resulting in the appearance of the hazard in the output signal thereof.

SUMMARY OF THE INVENTION

An object of the present invention is to provide a semiconductor memory device which can prevent a hazard from appearing in the output data, thereby realizing a perfect ECC relief, while increasing reliability in the reading operation of a device.

The above object is attained by devising a circuit constitution such that, regardless of whether or not a time at which a logical level of the output of each S/A circuit is settled coincides, the influence is not exerted on the operation of the subsequent ECC circuit.

Therefore, according to the present invention, there is provided a semiconductor memory device comprising: a memory cell array for storing a plurality of data words, each of the data words including information bits and check bits; a sense amplifying circuit operatively connected to the memory cell array for sensing the information bits and the check bits of a selected one of the data words; a latch circuit operatively connected to the sense amplifying circuit for latching the information bits and the check bits sensed by the sense amplifying circuit at a predetermined time after an address signal is changed; and an error correcting circuit operatively connected to the latch circuit for receiving the information bits and the check bits latched by the latch circuit and correcting the information bits based on the check bits.

BRIEF DESCRIPTION OF THE DRAWINGS

Other objects and features of the present invention will be described hereinafter in detail by way of preferred embodiments with reference to the accompanying drawings, in which.

DESCRIPTION OF THE PREFERRED EMBODIMENTS

Figure 2A:
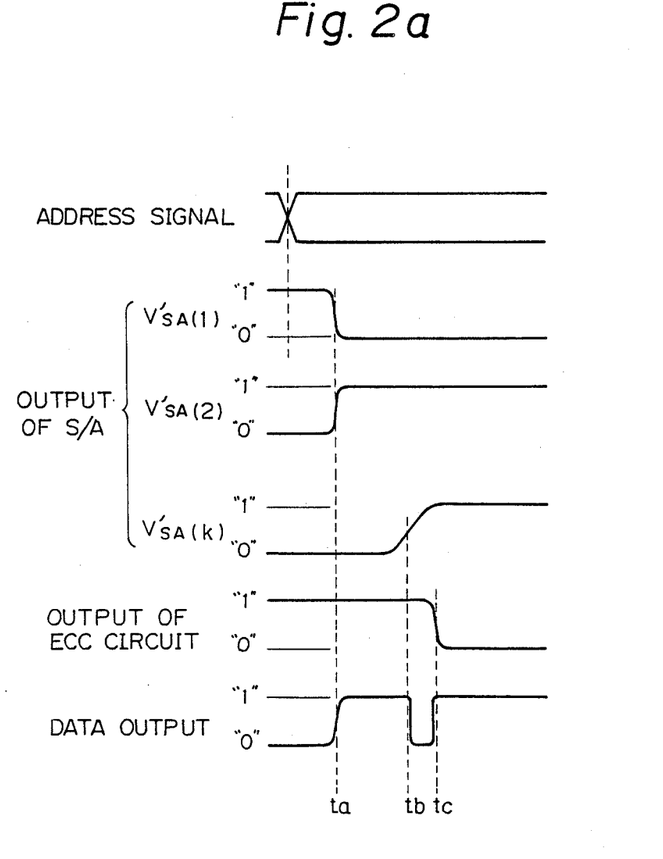
FIGS. 2a to 2d are diagrams for explaining a problem in the device shown in FIG. 1.
Figure 2B:
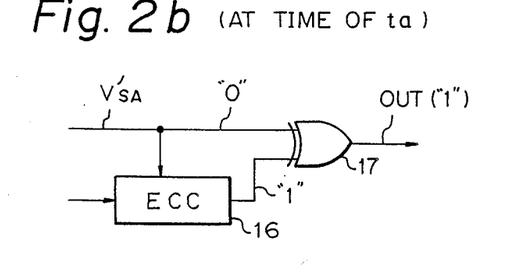
Figure 2C:
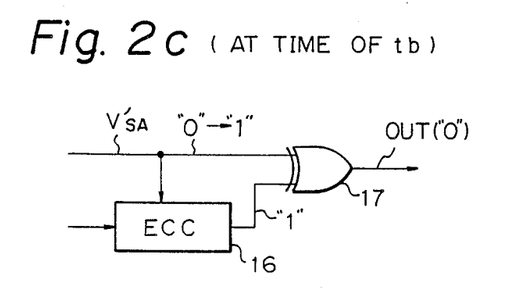
Figure 2D:
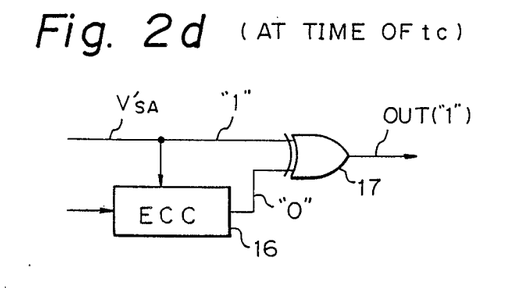
Figure 3A:
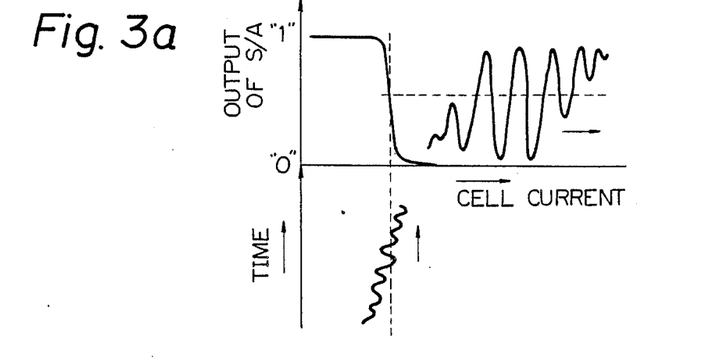
FIGS. 3a to 3c are diagrams for explaining another problem in the device shown in FIG. 1.
Figure 3B:
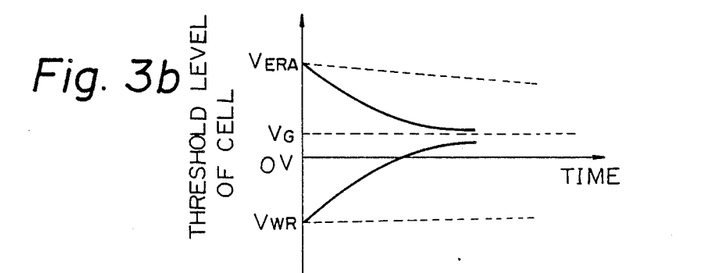
Figure 3C:
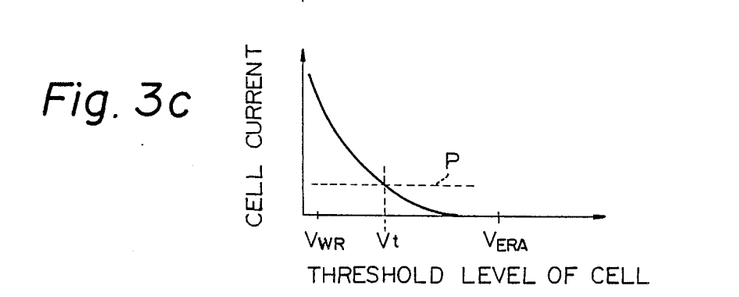

For a better understanding of the preferred embodiments, the problems in the prior art will now be explained with reference to FIGS. 1 to 3.

Figure 1:
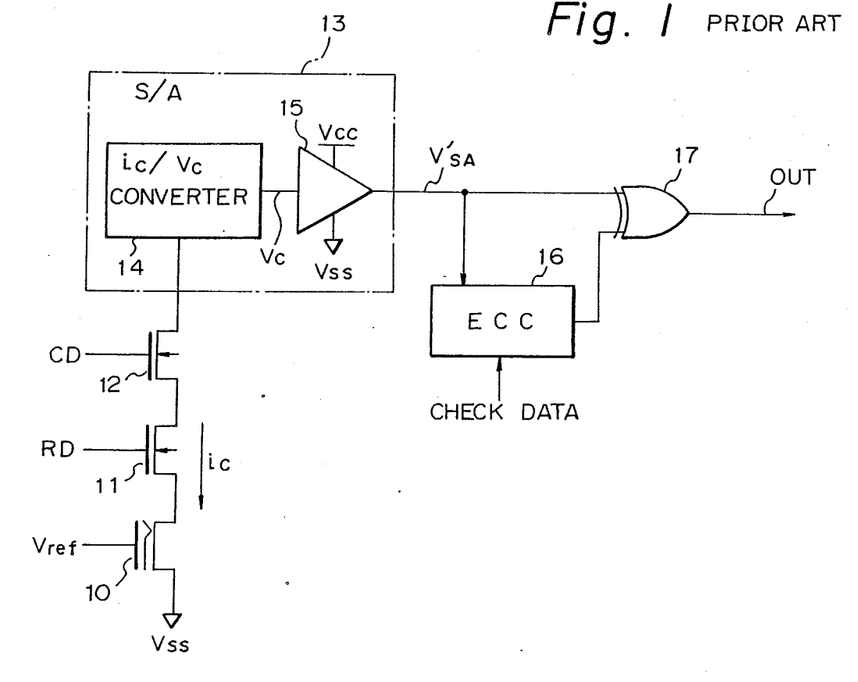
FIG. 1 is a circuit diagram illustrating a constitution of main parts of a prior art EEPROM device.

FIG. 1 shows a constitution of main parts of a prior art EEPROM device. In FIG. 1, reference 10 denotes an EEPROM cell having a dual-gate structure including a control gate to which a predetermined voltage $V_{ref}$ is applied; reference 11 denotes an N-channel type metal oxide semiconductor (NMOS) transistor having a control gate connected via a word line to a row decoder (RD); and reference 12 denotes an NMOS transistor having a control gate connected via a bit line to a column decoder (CD). The EEPROM cell 10, transistors 11 and 12 are connected in series. Reference 13 denotes an S/A circuit having a circuit 14 for converting a current $i_c$ flowing through the cell 10 into a voltage $V_c$ and 9 buffer 15 for effecting a buffering of the voltage $V_c$ output from the $i_c/V_c$ converter 14. Reference 16 denotes an ECC circuit and reference 17 denotes an exclusive-OR-gate.

In the constitution shown in FIG. 1, when the word line and bit line are selected by the row decoder RD and column decoder CD, respectively, based on an address designation, the corresponding transistors 11 and 12 are turned ON, resulting in the flow of current $i_c$ through the cell 10. The current $i_c$ is converted by the converter 14 to the voltage $V_c$, which is fed via the buffer 15 to the ECC circuit 16. The voltage or data $V'_{SA}$ output from the S/A circuit is, if wrong, corrected by the ECC circuit 16 based on a check data, which is generated based on a combination of certain bits of a write data input to the cell. As a result, the "right" data is read out as an output OUT. For example, assuming that the logical level of the output data $V'_{SA}$ of the S/A circuit is "0". If the data is a right one, the ECC circuit 16 outputs a signal of "0" level and feeds it to the exclusive-OR gate 17. In the case, a signal of "0" level, i.e., a right data is read out as the output OUT. On the other hand, if the data $V'_{SA}$ is a wrong one, the ECC circuit 16 outputs a signal of "1" level. In the case, a signal of "1" level is output through the exclusive-OR gate 17 as a right data.

Next, a problem in the device shown in FIG. 1 will be explained with reference to FIGS. 2a to 2d.

Assuming that a tunnel insulation film of the EEPROM cell corresponding to the "k"th S/A circuit is deteriorated and, for example, a small leak occurs in the tunnel insulation film. In the case, electric charges on a floating gate of the cell are decreased in quantity, resulting in the reduction in the margin between logical levels "1" and "0" of the cell. Accordingly, as shown in FIG. 2a, a transition from "0" level to "1" level of the output $V'_{SA}(k)$ of the "k"th S/A circuit is effected at a time of tb delayed from a time of ta, at which logical levels of the outputs $V'_{SA}(1)$, $V'_{SA}(2)$, —, of the S/A circuits corresponding to the other functional cells are settled.

In the case, at the time of ta, the output $V'_{SA}(k)$ of the "k"th S/A circuit, hereinafter indicated by $V'_{SA}$, is not at right "1" level, but at a wrong "0" level. Accordingly, as shown in FIG. 2b, the ECC circuit 16 outputs a signal of "1" level and feeds it to the exclusive-OR gate 17. Namely, the ECC circuit 16 effects a correct operation. As a result, a signal of "1" level is output through the gate 17 as a corrected output signal OUT.

Next, at the time of tb, a transition from "0" level to "1" level of the S/A output $V'_{SA}$ is effected, and the ECC circuit 16 operates in response to the transition. As shown in FIG. 2c, however, the ECC circuit 16 cannot quickly effect its operation and, accordingly, outputs a signal of "1" level for a while. Thus, a transient error signal, i.e., hazard, of "0" level as shown in FIG. 2a is output through the gate 17 as a wrong output signal OUT.

Next, at the time of tc (see FIG. 2d), the ECC circuit 16 outputs a signal of "0" level indicating a cancellation of the aforementioned correct operation and feeds it to the exclusive-OR gate 17. As a result, a signal of "1" level is output through the gate 17 as a right output signal OUT.

As explained above, in the EEPROM device having the ECC circuit, when a margin between logical levels "1" and "0" of a certain cell is decreased and, accordingly, a transition of level of the output of a corresponding S/A is delayed, the ECC circuit cannot quickly effect its check and correct operation. Therefore, the ECC circuit once effects a correct operation and, then, effects a cancellation of the correct operation. Due to the two operations, a hazard inevitably appears in the output signal OUT. This means that an ECC relief cannot be perfectly carried out, which is undesirable from a viewpoint of a highly-accurate reading of data.

Next, another problem in the device shown in FIG. 1 will be explained with reference to FIGS. 3a to 3c.

When the aforementioned margin is worsened and decreased to an extent such that the magnitude of cell current is settled in the vicinity of the transition region between "1" and "0" of the S/A output (see FIG. 3a), the S/A output is not settled to "1" or "0" level, but oscillation of the S/A output signal occurs due to a small leak in the tunnel insulation film and a decrease in charges on the floating gate by the leak. In this case, as shown in FIG. 3b by a solid line, the magnitude of a threshold level o the cell gradually becomes small with the lapse of time. Note, in FIG. 3b, reference $V_G$ indicates a threshold level at which electric charges are not present on the floating gate; reference $V_{ERA}$ indicates a threshold level of the cell at the erasing of data; and reference $V_{WR}$ indicates a threshold level of the cell at the writing of data. Also, a broken line represents a change in threshold level of the functional cell in which a small leak does not occur. FIG. 3c shows a relation between a cell current and a threshold level of th cell. In FIG. 3c, a broken line indicated by reference P represents the magnitude of the cell current flowing at the transition between "1" and "0" of the S/A output, and reference $V_t$ denotes a threshold level at the transition. As for a cell in which a small leak occurs, the difference between the threshold level of the cell at the programming or erasing and the level of $V_G$ (see FIG. 3b) is extremely small. According, even if the level of $V_G$ is set in the vicinity of the level of $V_t$ (see FIG. 3c) in either of the sides of $V_t$, the magnitude of the cell current traverses the transition region between "1" and "0" of the S/A output. As a result, the S/A output oscillates as shown in FIG. 3a.

Thus, in the EEPROM device in which the margin of a certain cell is worsened to an, extent such that the corresponding S/A output oscillates, the ECC circuit cannot effect its check and correct operation with a high reliability, so that a perfect ECC relief becomes impossible.

Figure 4:
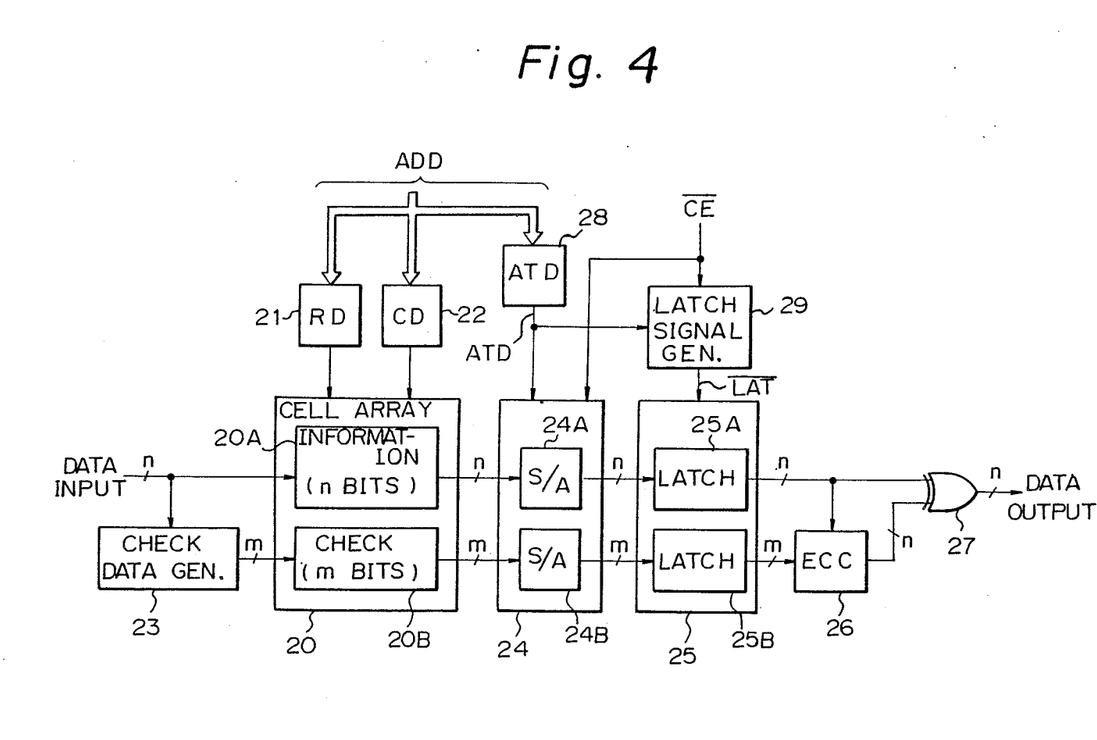
FIG. 4 is a block diagram illustrating a constitution of the semiconductor memory device according to the present invention.

FIG. 4 illustrates a constitution of the semiconductor memory device according to the present invention. The illustration of FIG. 4 shows a memory including an ECC arrangement constituted by a check data generating circuit 23, a cell array 20B for the check data, S/A circuits 24B, latch circuits 25B, an ECC circuit 26 and an exclusive-OR gate 27.

In FIG. 4, reference 20 denotes a memory cell array having a memory cell provided at each intersection between a plurality of word lines and a plurality of bit lines. The memory cell array 20 includes a memory region 20A allocated for an information data of n bits and a memory region 20B allocated for a check data of m bits. Reference 21 denotes a row decoder (RD) for selecting one of the word lines in the cell array 20 in response to an address signal ADD, and reference 22 denotes a column decoder (CD) for selecting the bit lines corresponding to the sum of n bits and m bits in response to the address signal ADD. The check data generating circuit 23 has a function of generating a check data of m bits based on a certain combination of the data input of n bits. Reference 24 denotes a plurality of S/A circuits including S/A circuits 24A provided for the information data of n bits and S/A circuits 24B provided for the check data of m bits. Each of the S/A circuits senses one bit of the information data or check data stored in a memory cell selected based on the decoding of the address signal ADD.

Reference 25 denotes a plurality of latch circuits including latch circuits 25A provided for each of the S/A circuits 24A and latch circuits 25B provided for each of the S/A circuits 24B. Each of the latch circuits latches a logical level of a bit signal output from a corresponding S/A circuit at a time a predetermined time period after a change in the address signal ADD. That is, each latch circuit latches the logical level in response to a latch signal $\overline{LAT}$ from a latch signal generating circuit 29. Reference 28 denotes an address transition detecting (ATD) circuit, which generates a signal ATD in response to the change in the address signal ADD. The latch signal generating circuit 29 has a function of generating the above latch signal $\overline{LAT}$ in response to a chip enable signal $\overline{CE}$ and the signal ATD from the ATD circuit 28. A concrete constitution of the latch signal generating circuit 29 will be described later in detail.

Referring to the ECC arrangement, the check data of m bits generated by the circuit 23 are stored in the check cell array 20B and amplified by the S/A circuits 24B. The amplified check data are input via the latch circuits 25B to the ECC circuit 26. The ECC circuit 26 effects its check and correct operation based on a combination of the information data of n bits and the check data of m bits. For example, where any one of bits of the information data is at "0" level and wrong, the ECC circuit 26 inverts a level of the wrong bit, i.e., changes to "1" level. Accordingly, the exclusive-OR gate 27 receives a wrong signal of "0" level from the latch 25A and a corrected signal of "1" level from the ECC circuit 26, and outputs a signal of "1" level representing a "right" signal.

A preferred embodiment of the present invention will now be described in detail with reference to FIGS. 5 to 11.

Figure 5:
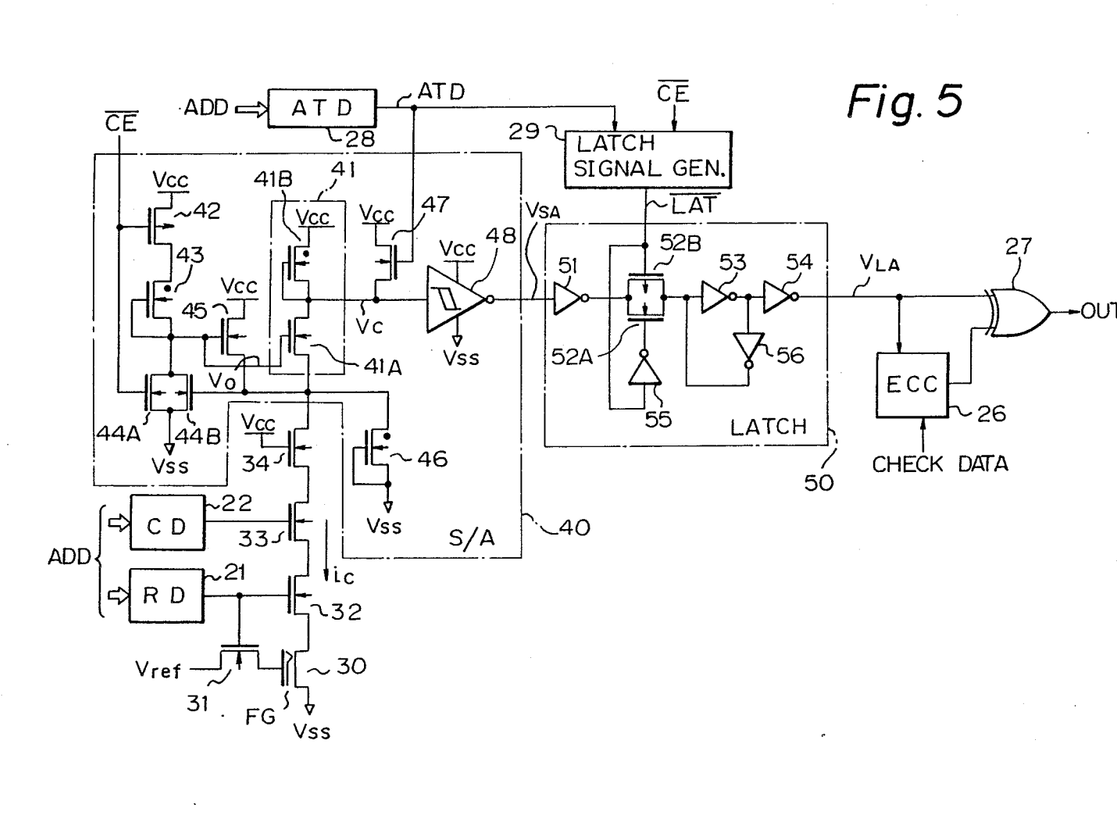
FIG. 5 is a circuit diagram illustrating an embodiment of the present invention.

FIG. 5 illustrates a circuit diagram of an embodiment of the present invention. Note, the illustration of FIG. 5 shows a constitution with respect to only one memory cell in order to simplify the explanation. Also, in the description below, a term "transistor" indicates an enhancement type NMOS field effect transistor, so far as a special definition is not added thereto.

In FIG. 5, reference 30 denotes an EEPROM cell having a floating gate FG and a control gate, to which a predetermined voltage $V_{ref}$ is applied via a source/drain of a transistor 31. A gate of the transistor 31 is connected to the aforementioned row decoder (RD) 21. In the EEPROM cell 30, the writing or erasing of a data is carried out through a tunnel insulation film (not shown) by injecting electric charges into the floating gate FG or emitting them therefrom. A source of the cell 30 is connected to a lower power supply line $V_{ss}$ (0V), and a drain thereof is connected via transistors 32, 33 and 34 to an $i_c/V_c$ converter 41 in an S/A circuit 40.

A gate of the transistor 32 is connected via a word line to the row decoder 21, which effects an operation for a cell selection based on the address (ADD) designation and turns ON the corresponding transistor 32. On the other hand, a gate of the transistor 33 is connected via a bit line to the column decoder 22, which effects an operation for a cell selection based on the address (ADD) designation and turns ON the corresponding transistor 33. Also, a gate of the transistor 34 is connected to a higher power supply line $V_{cc}$ (5V) in the reading operation of data. Contrary to this, in the writing operation of data, a voltage of "0" level is applied to the gate of the transistor 34, so that the S/A circuit side and the bit line side are electrically separated. In the illustrated example, assuming that the transistors 32 and 33 are in the ON state. In the state, where positive charges are accumulated in the floating gate FG of the cell 30, i.e., where the cell is in the "0" state, a cell current $i_c$ flows. Inversely, where negative charges are accumulated in the floating gate FG, i.e., where the cell is in the "1" state, the cell current $i_c$ does not flow.

In the S/A circuit 40, the $i_c/V_c$ converter 41 is constituted by a transistor 41A having a gate to which a reference voltage $V_0$ is applied and a depletion type transistor 41B having a drain to which the power supply voltage $V_{cc}$ is applied, and has a function of converting the change in the cell current $i_c$ to that in the voltage $V_c$. Furthermore, a PMOS transistor 42, a depletion type transistor 43 and two transistors 44A and 44B connected in parallel with each other are connected in series between the power supply line $V_{cc}$ and $V_{ss}$. A low active chip enable signal $\overline{CE}$ is applied to each gate of the transistors 42 and 44A. Also, a source of the transistor 43 is connected to each gate of the transistors 41A and 45. A drain of the transistor 45 is connected to the power supply line $V_{cc}$, and a source thereof is connected to the source of the transistor 41A and a gate of the transistor 44B. Accordingly, when the chip enable signal $\overline{CE}$ is at "1" level, i.e., in the chip non-selection state, the transistor 44A is turned ON and, accordingly, the aforementioned reference voltage $V_0$ is brought to "0" level. Inversely, when the signal $\overline{CE}$ is at "0" level, i.e., in the chip selection state, the transistor 42 is turned ON and, accordingly, the reference voltage $V_0$ is brought to "1" level. At the time, the transistor 41A is turned ON, so that the output voltage $V_c$ of the $i_c/V_c$ converter 41 is changed in accordance with the magnitude of the cell current $i_c$.

Reference 46 denotes a depletion type transistor, which is connected between the source of the transistor 41A and the power supply line $V_{ss}$ and has a function of drawing and emitting electric charges accumulated on the bit line corresponding to the cell in the non-selection state. Reference 47 denotes a transistor which is turned ON in response to the signal ATD of "1" level from the ATD circuit 28. A drain of the transistor 47 is connected to the power supply line $V_{cc}$, and a source thereof is connected to the output end of the $i_c/V_c$ converter 41. Reference 48 denotes a Schmitt trigger having a predetermined hysteresis voltage Vh, which responds to the output voltage $V_c$ of the $i_c/V_c$ converter 41 and outputs a signal $V_{SA}$. The characteristics and function of the Schmitt trigger will be described later in detail.

Reference 50 denotes a latch circuit, which has a function of holding the level of the signal $V_{SA}$ output from the S/A circuit 40 in response to the latch signal $\overline{LAT}$ of "0" level output from the latch signal generating circuit 29 at a time a predetermined time period after a change in address, and outputting the holded signal as a signal $V_{LA}$.

In the latch circuit 50, an inverter 51, a transistor 52A and a PMOS transistor 52B connected in parallel with each other, an inverter 53 and an inverter 54 are connected in series between the input and output ends. A gate of the transistor 52B is connected to the output end of the latch signal generating circuit 29 and, via an inverter 55, to a gate of the transistor 52A. Also, the output end of the inverter 53 is connected via an inverter 56 to the input end thereof. When the latch signal $\overline{LAT}$ output from the latch signal generating circuit 29 is at "1" level, both of the transistors 52A and 52B are in the OFF state, so that the input end and the output end are electrically separated. Namely, the output $V_{SA}$ of the S/A circuit 40 is not transmitted to the ECC circuit 26. When the latch signal $\overline{LAT}$ changes to "0" level, the transistors 52A and 52B are turned ON, resulting in the transmission of the S/A output $V_{SA}$ to the ECC circuit 26. A timing at which the latch signal $\overline{LAT}$ changes from "1" level to "0" level is determined in the latch signal generating circuit 29.

Figure 6:
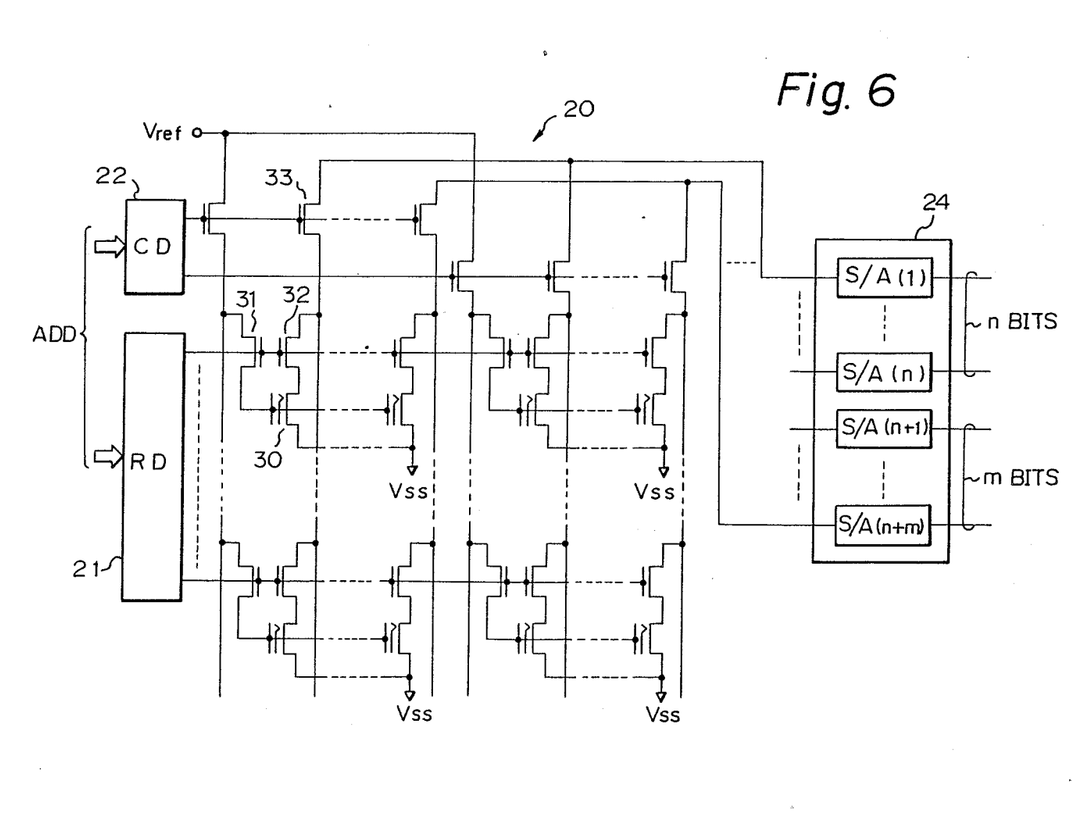
FIG. 6 is a circuit diagram illustrating a constitution, representing only an arrangement for reading data, of the cell array shown in FIG. 4.

FIG. 6 illustrates a constitution, representing only an arrangement for reading data, of the cell array 20 shown in FIG. 4. As shown in FIG. 6, the cell array 20 has an EEPROM cell 30 provided at each intersection between a plurality of word lines and a plurality of bit lines. In the illustrated constitution, when the cell 30 is selected, the corresponding transistors 32 and 33 are turned ON. In this state, where positive charges are accumulated in the floating gate of the cell 30, a cell current flows from the corresponding S/A circuit via transistors 32, 33 and the cell 30 to the power supply line $V_{ss}$.

Next, an example of the constitution of the latch signal generating circuit 29 will be described with reference to FIG. 7. The illustration of FIG. 7 shows a circuit constitution which employs a dummy EEPROM cell 710, a dummy S/A circuit 720 having the same arrangement as the S/A circuit 40 shown in FIG. 5, and a number of gate elements, thereby generating the latch signal $\overline{LAT}$.

Figure 7:
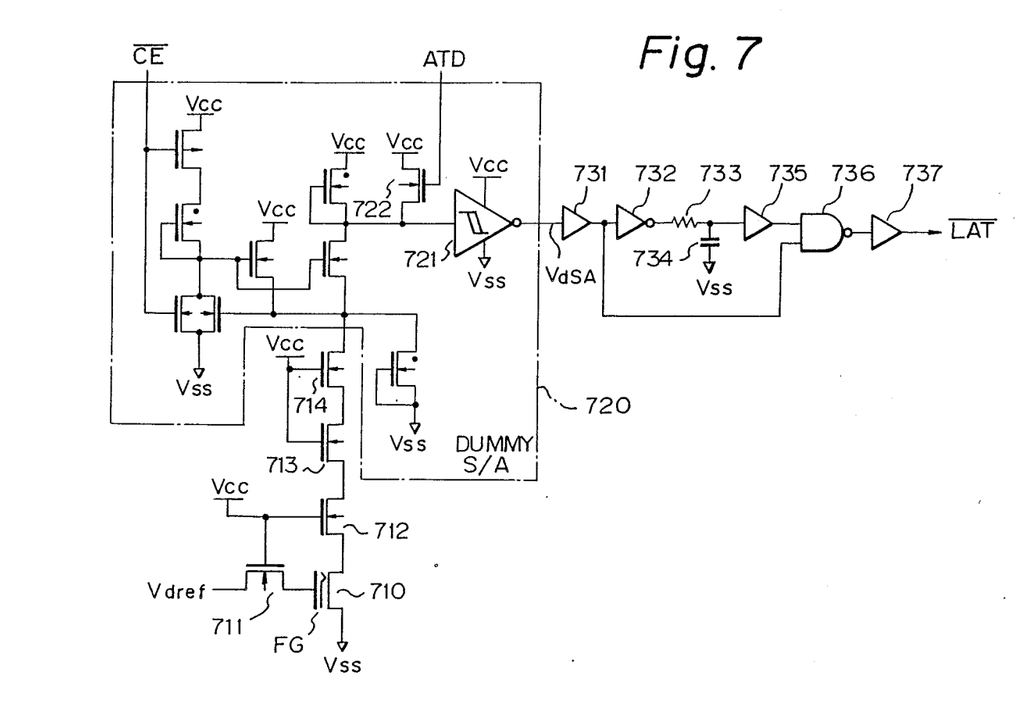
FIG. 7 is a circuit diagram illustrating a constitution of the latch signal generating circuit shown in FIGS. 4 and 5.

In FIG. 7, the manner in the connection of the dummy cell 710 and transistors 711 to 714 is substantially the same as that of the cell 30 and transistors 31 to 34 shown in FIG. 5, so that the explanation thereof will be omitted. Note, as for the dummy cell 710, a constant cell current must flow therethrough regardless of the selection or non-selection state of the cell 30. Accordingly, in the illustrated example, the higher power supply voltage $V_{cc}$ is applied to each control gate of the transistors 711 to 714, so that each transistor is normally in the ON state. The output signal $V_{dSA}$ of the dummy S/A circuit 720 is input to a buffer 731. The output end of the buffer 731 is connected to an inverter 732 and one input end of an NAND gate 736. The output end of the inverter 732 is connected via a resistor 733 to a buffer 735 and one end of a capacitor 734, the other end of which being connected to the power supply line $V_{ss}$. The output end of the buffer 735 is connected to another input end of the NAND gate 736, the output end of which being connected via a buffer 737 to the output end of the present circuit.

When the output $V_{dSA}$ of the dummy S/A circuit 720 is not changed in level, the latch signal $\overline{LAT}$ maintains "1" level because of the arrangement of the inverter 732, resistor 733, capacitor 734, buffer 735 and NAND gate 736. Inversely speaking, when the level of the output signal $V_{dSA}$ is changed, the latch signal $\overline{LAT}$ falls to "0" level.

According to the constitution of FIG. 7, when the chip enable signal $\overline{CE}$ is at "0" level, i.e., in the chip selection state, the input end of the Schmitt trigger 721 is at the level of $V_{ss}$, i.e., "0" level. In the state, when the address signal is changed and, accordingly, the signal ATD of "1" level is output, the transistor 722 is turned ON, so that the level of the input end of the Schmitt trigger 721 rises to "1" level. However, as stated later, the output of the Schmitt trigger 721 does not quickly respond to the change in level at the input end, but responds with a certain delay.

In other words, when the address signal is changed, the output $V_{dSA}$ of the dummy S/A circuit 720 is changed in level with a predetermined delay defined by the characteristics of the Schmitt trigger 721. At the time, the latch signal $\overline{LAT}$ changes from "1" level to "0" level.

Next, an example of the constitution of the ATD circuit 28 will be described with reference to FIG. 8.

Figure 8:
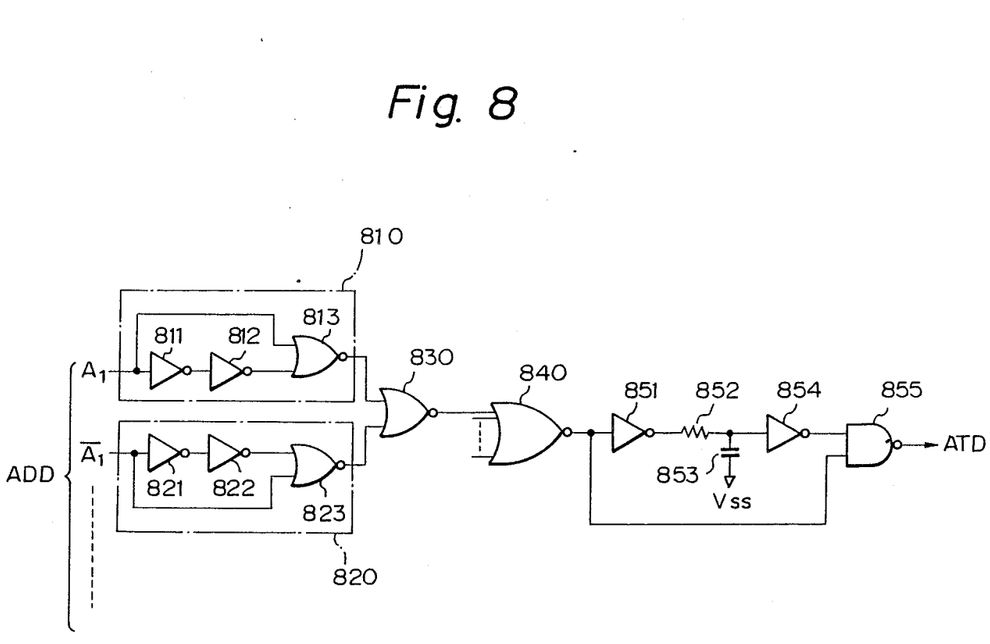
FIG. 8 is a circuit diagram illustrating a constitution of the address transition detecting (ATD) circuit shown in FIGS. 4 and 5.

In FIG. 8, reference 810 denotes an inverter circuit, which is constituted by an inverter 811 responding to a signal $A_1$ corresponding to one bit among the address signal ADD, an inverter 812 responding to the output of the inverter 811, and NOR gate 813 responding to the signal $A_1$ and the output of the inverter 812. Reference 820 denotes an inverter circuit having the same constitution as the inverter circuit 810, except that a complementary signal $\overline{A}_1$ of the signal $A_1$ is utilized. In the inverter circuit 810, the inverters 811 and 812 function as a delay circuit. For example, when the address bit A is changed in level, a pulse having a width corresponding to the delay amount of the inverters 811 and 812 is generated at the output end of the NOR gate 813. The operation of the inverter circuit 820 is the same as that of the circuit 810. The output signals of the inverter circuits 810 and 820 are input to NOR gate 830, and the output of the NOR gate 830 is input to NOR gate 840. The output end of the NOR gate 840 is connected to an inverter 851 and one input end of an NAND gate 855. The output end of the inverter 851 is connected via a resistor 852 to an inverter 854 and one end of a capacitor 853, the other end of which being connected to the power supply line $V_{ss}$. The output end of the inverter 854 is connected to another input end of the NAND gate 855, the output end of which being connected to the output end of the present circuit.

Next, the reading operation of the device shown in FIG. 5 will be explained with reference to the waveform diagrams shown in FIGS. 9a to 9i.

Figure 9A:
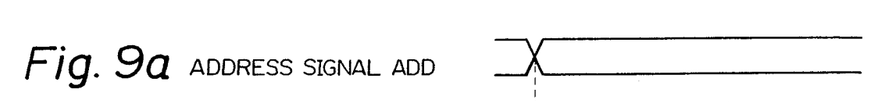
FIGS. 9a to 9i are waveform diagrams for explaining a reading operation of the device shown in FIG. 5.
Figure 9B:
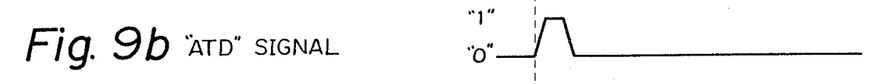
Figure 9C:
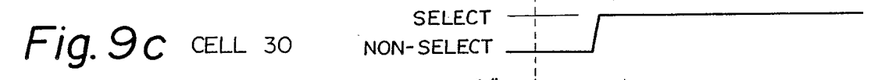
Figure 9D:
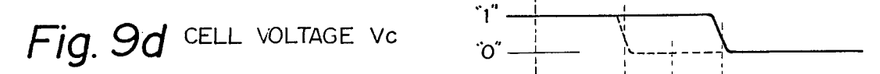
Figure 9E:
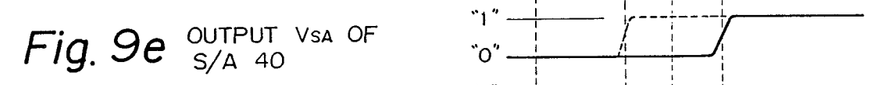
Figure 9F:
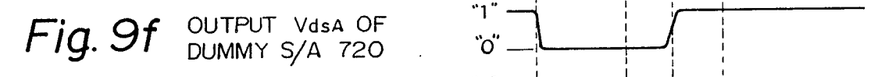
Figure 9G:
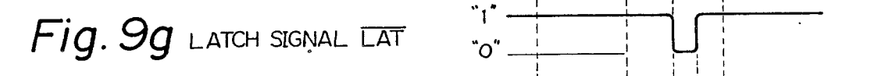
Figure 9H:
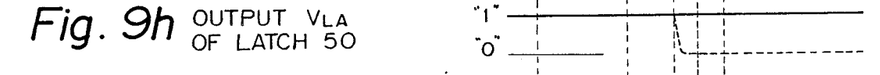
Figure 9I:
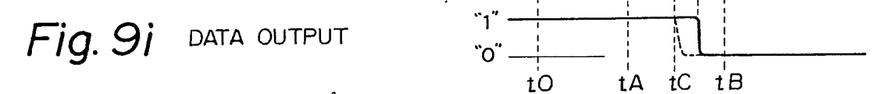

In FIGS. 9d, 9e, 9h and 9i, the waveform indicated by a broken line represents a change in voltage in the case that the selected cell is sound or functional. First, when the address signal ADD is changed at a time of t0, the "ATD" signal of "1" level is generated. After a while, when the corresponding cell 30 is selected, i.e., the chip enable signal $\overline{CE}$ is lowered to "0" level, the transistor 41A of the $i_c/V_c$ converter 41 in FIG. 5 is turned ON, so that the cell voltage $V_c$ falls to "0" level at a time of tA. Since the cell is sound, the logical level of the output $V_{SA}$ of the S/A circuit 40 is settled at the time of tA. Accordingly, when the latch signal $\overline{LAT}$ falls to "0" level at a time of tC delayed by the predetermined time period from the change in address, the transistors 52A and 52B of the latch circuit 50 in FIG. 5 are turned ON, so that the S/A output $V_{SA}$ of "1" level is transmitted via three inverters 51, 53 and 54, and output as the signal $V_{LA}$ of "0" level. The ECC circuit 26 effects its check and correct operation for the signal $V_{LA}$ output at the time of tC, at which the S/A output $V_{SA}$ has been already settled to the "right" level, i.e., "1" level in the illustrated example. Therefore, as shown in FIG. 9i by a broken line, the right data of "0" level is output at the time of tC.

On the other hand, in FIGS. 9d, 9e, 9h and 9i, the waveform indicated by a solid line represents a change in voltage in the case that the selected cell is non-functional due to the leak of charges and, accordingly, the level of the corresponding S/A output $V_{SA}$ is settled at a time of tB delayed from the rightful time of tA.

In this case, when the latch signal $\overline{LAT}$ falls to "0" level at the time of tC, the S/A output $V_{SA}$ of the wrong "0" level is transmitted via the latch circuit 50 and output as the signal $V_{LA}$ of "1" level. The ECC circuit 26 once effects its check and correct operation for the signal $V_{LA}$ of the wrong level, which is maintained in the state of "1" level to the time of tB and thereafter. By the operation of the ECC circuit 26, the data output falls to "0" level at a time a while after the time of tC. Since the level of the signal $V_{LA}$ is "1" level at the time of tB, it is not necessary for the ECC circuit 26 to cancel the check and correct operation carried out at the time of tC. That is, when the output signal from the S/A circuit 40 is a wrong one, the ECC circuit 26 once effects its check and correct operation. After a while, when the wrong output signal is changed to the right logical level, the ECC circuit 26 need not effect the cancellation of the above check and correct operation. Accordingly, although a hazard appears in the data output at the times of tb to tc in the prior art (see FIG. 2a), in the present embodiment, it is possible to perfectly remove a possibility of the appearance of a hazard at the time of tB, as shown in FIG. 9i.

Next, the operation of the Schmitt trigger in the S/A circuit 40 shown in FIG. 5 will be explained with reference to FIGS. 10a to 10e.

Figure 10A:
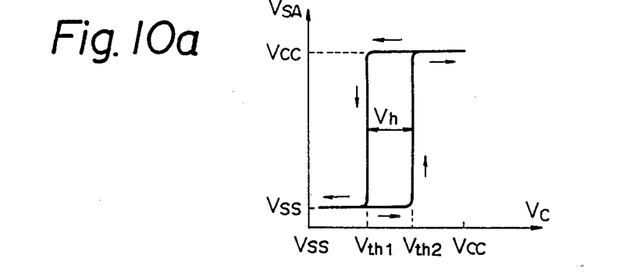
FIGS. 10a to 10e are diagrams for explaining an operation of the Schmitt trigger in the S/A circuit shown in FIG. 5.

FIG. 10a illustrates a hysteresis characteristic, in which, when the level of the input signal $V_c$ traverses a first threshold voltage $V_{th1}$ or a second threshold voltage $V_{th2}$, the level of the output signal $V_{SA}$, i.e., the S/A output signal, changes to $V_{cc}$ ("1") level or $V_{ss}$ ("0") level. Therefore, even if the cell current $i_c$ fluctuates and, accordingly, the cell voltage $V_C$ is changed in level, where the magnitude of the fluctuation of the cell voltage $V_C$ is within the range of the hysteresis voltage Vh, the influence by the fluctuation is not exerted on the output signal, i.e., the S/A output $V_{SA}$.

Figure 10B:
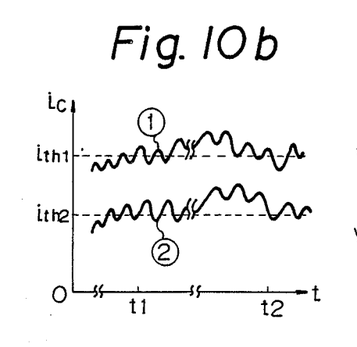
Figure 10C:
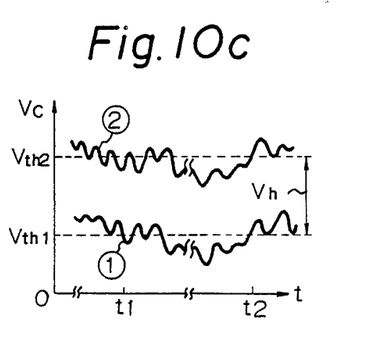
Figure 10D:
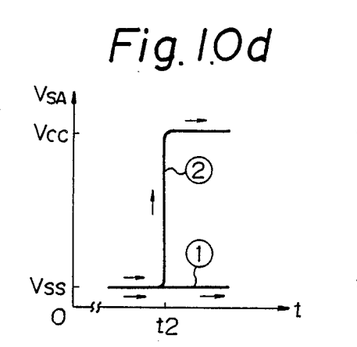
Figure 10E:
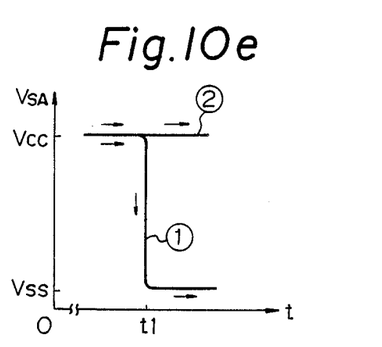

For example, even if the cell current $i_c$ is overlapped by noises or the like as shown in FIG. 10b by a mark ① and, accordingly, the cell voltage $V_c$ fluctuates as shown in FIG. 10c by a mark ①, the magnitude of the fluctuation is sufficiently within the range of the hysteresis voltage Vh. Therefore, where the previous state of the S/A output $V_{SA}$ is in the $V_{ss}$ ("0") level, the S/A output VSA maintains the state of "0" level without being oscillated, as shown in FIG. 10d by a mark ①. Inversely, where the previous state is in the $V_{cc}$ ("1") level, the S/A output $V_{SA}$ changes to the state of "0" level without being oscillated at a time of t1, as shown in FIG. 10e by a mark ①. Likewise, where the cell current $i_c$ fluctuates as shown in FIG. 10b by a mark ②, the S/A output $V_{SA}$ is stably settled to the predetermined level without being oscillated.

Figure 11:
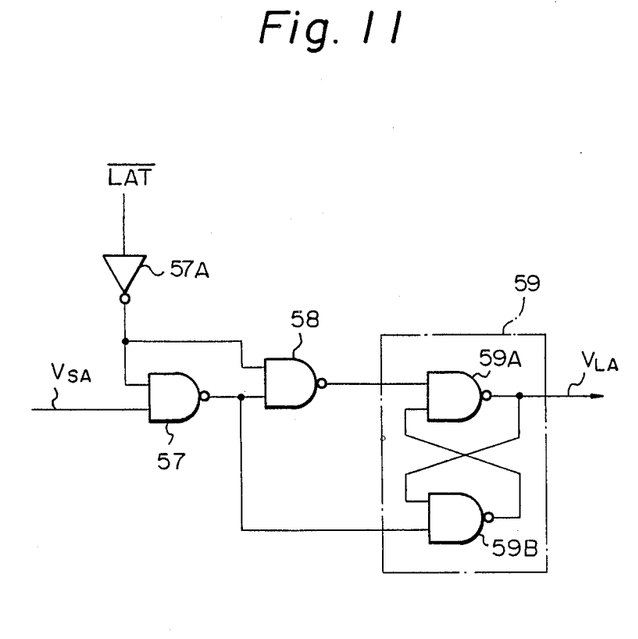
FIG. 11 a circuit diagram illustrating another constitution of the latch circuit shown in FIG. 5.

FIG. 11 illustrates another constitution of the latch circuit shown in FIG. 5.

The latch circuit of FIG. 11 is constituted by an inverter 57A responding to the latch signal $\overline{LAT}$, an NAND gate 57 responding to the S/A output $V_{SA}$ and the output of the inverter 57A, an NAND gate 58 responding to the output of the NAND gate 57 and the output of the inverter 57A, and a flipflop 59 responding to the outputs of the NAND gates 58 and 57. The flipflop 59 is constituted by two NAND gates 59A and 59B and outputs the signal $V_{LA}$.

Although, in the described and illustrated embodiment, an EEPROM cell is employed as a memory cell, the present invention is not restricted to a nonvolatile memory such as the EEPROM in which the memory cell may become non-functional due to the leak in the cell in use, as is obvious from the spirit or essential features thereof. For example, the present invention is applicable to a volatile memory such as a DRAM, an SRAM or the like. Namely, the present invention can be widely applied to any conventional memory having a problem in that a time at which a logical level of the output of each S/A circuit is settled does not coincide and, accordingly, the subsequent ECC circuit cannot realize a perfect ECC relief.

Although the present invention has been disclosed and described by way of only one embodiment, it is apparent to those skilled in the art that other embodiments and modifications of the present invention are possible without departing from the spirit or essential features thereof.

We claim:

1. A semiconductor memory device comprising:
    a memory cell array (20) for storing a plurality of data words, each of said data words including information bits and check bits;
    a sense amplifying circuit (24), operatively connected to said memory cell array, for sensing said information bits and said check bits of a selected one of said data words;

a latch circuit (25), operatively connected to said sense amplifying circuit, for latching said information bits and said check bits sensed by said sense amplifying circuit at a predetermined time after an address signal is changed;

an error correcting circuit (26, 27), operatively connected to said latch circuit, for receiving said information bits and said check bits latched by said latch circuit and correcting said information bits based on said check bits; and a circuit (29) for generating a latch signal (LAT) in response to a change in said address signal and feeding said latch signal to said latch circuit.

2. A device as set forth in claim 1, wherein said latch signal is generated after a time period which is longer than a normal change transition time of said sense amplifying circuit.

3. A device as set forth in claim 2, wherein said memory cell array includes a memory cell provided at each intersection between a plurality of word lines and a plurality of bit lines.

4. A device as set forth in claim 3, wherein said sense amplifying circuit comprises a converter for converting a change in current flowing through a selected cell to a change in cell voltage, and a Schmitt trigger having a predetermined hysteresis voltage and responding to said change in said cell voltage.

5. A device as set forth in claim 4, wherein said predetermined hysteresis voltage is selected so that a magnitude of a fluctuation of said cell voltage is within a range of said hysteresis voltage.

6. A device as set forth in claim 5, wherein said latch signal generating circuit comprises a dummy cell through which a constant cell current normally flows and a dummy sense amplifying circuit having the same constitution as said sense amplifying circuit, thereby generating said latch signal at said predetermined time after a change in said address signal.

7. A device as set forth in claim 6, wherein said latch circuit comprises a gate having a pair of transistors, said gate being opened in response to said latch signal of a predetermined logical level, thereby transmitting a bit signal output from said sense amplifying circuit to said error correcting circuit.

8. A device as set forth in claim 6, wherein said latch circuit comprises a flipflop, said flipflop transmitting a bit signal output from said sense amplifying circuit to said error correcting circuit when said latch signal is at a first logical level, and blocking a transmission of said bit signal to said error correcting circuit when said latch signal is at a second logical level.

9. A device as set forth in claim 1, wherein said memory cell comprises a non-volatile memory cell.

10. A device as set forth in claim 1, wherein said memory cell comprises a volatile memory cell.

* * * * *